(12) United States Patent
Zhao et al.

(10) Patent No.: US 12,529,167 B2
(45) Date of Patent: Jan. 20, 2026

(54) BICOMPONENT POLYMERIC FIBERS

(71) Applicant: ExxonMobil Chemical Patents Inc., Baytown, TX (US)

(72) Inventors: Bin Zhao, Songjing (CN); Abigail I. Agentis, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 18/338,570

(22) Filed: Jun. 21, 2023

(65) Prior Publication Data
US 2023/0332335 A1  Oct. 19, 2023

Related U.S. Application Data

(62) Division of application No. 16/540,239, filed on Aug. 14, 2019, now abandoned.

(60) Provisional application No. 62/724,994, filed on Aug. 30, 2018.

(51) Int. Cl.
| | |
|---|---|
| *D01F 8/06* | (2006.01) |
| *C08F 210/06* | (2006.01) |
| *D04H 3/005* | (2012.01) |
| *D04H 3/16* | (2006.01) |

(52) U.S. Cl.
CPC .............. *D01F 8/06* (2013.01); *C08F 210/06* (2013.01); *D04H 3/005* (2013.01); *D04H 3/16* (2013.01); *D10B 2401/041* (2013.01)

(58) Field of Classification Search
None
See application file for complete search history.

(56) References Cited

U.S. PATENT DOCUMENTS

| | | | |
|---|---|---|---|
| 2003/0124348 A1* | 7/2003 | Arora | D01F 6/04 442/329 |
| 2004/0236042 A1* | 11/2004 | Datta | C08F 210/06 526/170 |
| 2010/0124864 A1* | 5/2010 | Dharmarajan | B32B 37/144 156/308.2 |
| 2015/0143653 A1* | 5/2015 | Thomas | A47L 13/18 264/103 |

FOREIGN PATENT DOCUMENTS

JP   2012237081   * 12/2012

OTHER PUBLICATIONS

Omnexus—(https://omnexus.specialchem.com/polymer-properties/properties/stiffness. (Year: 2021).*
Machine Translation of JP2012237081 (Year: 2012).*

* cited by examiner

*Primary Examiner* — Shawn Mckinnon
(74) *Attorney, Agent, or Firm* — ExxonMobil Chemical Patents Inc.

(57) ABSTRACT

A bicomponent fiber comprising a sheath, where the sheath includes a propylene-based elastomer, said propylene-based elastomer including propylene-derived units and from about 3.0 to about 15 wt % alpha-olefin-derived units other than propylene-derived units, based upon the entire weight of the copolymer, said propylene-based elastomer having a triad tacticity of greater than 75%, and a heat of fusion, as determined by DSC, of less than 75 J/g; and a core, where the melt temperature of the core, as determined by DSC, is at least 5% greater than the melt temperature of the sheath.

15 Claims, No Drawings

BICOMPONENT POLYMERIC FIBERS

CROSS-REFERENCE TO RELATED APPLICATIONS

This application is a divisional of U.S. application Ser. No. 16/540,239 filed Aug. 14, 2019, which claims priority to U.S. Ser. No. 62/724,994, filed Aug. 30, 2018, herein incorporated by reference.

FIELD OF THE INVENTION

Embodiments of the present invention are directed toward bicomponent polymer fibers having a core and a sheath, wherein the sheath includes a propylene-based elastomer.

BACKGROUND OF THE INVENTION

Air-through bonded nonwovens are fabrics that are bonded through heat, typically hot air, using processes that are also referred to as air-through bonding. Air-through bonded nonwovens, which may also be referred to as air-through nonwovens, offer several advantages including bulkiness, softness, and good hand feel. These nonwoven fabrics are also advantageous because they lack chemical bonding agents. As a result, air-through nonwovens are useful in the manufacture of a wide range of articles, especially disposable hygiene goods such as diapers, sanitary napkins, training pants, and adult incontinence products.

Air-through nonwovens are conventionally produced from multilayered fibers. Generally speaking, these multilayered fibers include a core of a relatively high melt polymer encased within a polymer having a lower melt temperature (i.e. a sheath). Hot air is applied to at least partially melt the sheath and thereby bond or heat set the fibers. The nonwoven fabric to which the air-through bonding is applied can be formed by a variety of technologies including carding, spunbonding, airlaying, thermal bonding, wetlaying and spunlacing. Conventionally, many air-through bonded nonwoven fabrics are prepared from carded multilayer staple fiber webs or spunmelt nonwoven webs of multilayered fibers.

Multilayered fibers, which are also referred to as multicomponent fibers, are often prepared by using a spinning process in which separate polymer streams are fed to a single die or spinneret in order to form fibers having two (or more) polymer phases. While many structural variations of multicomponent fibers exist, sheath-core, or core-sheath, multicomponent fibers are often used in the manufacture of air-through nonwoven fabrics, especially those used in the manufacture of disposable hygiene products. In this regard, it is common to employ polypropylene or polyethylene terephthalate within the core, and polyethylene, which has a lower melt temperature, within the sheath. Polypropylene and polyethylene terephthalate have higher stiffness and melt temperatures, which ensure that the fiber bulkiness can be maintained during the air-through bonding process.

SUMMARY OF THE INVENTION

One or more embodiments of the present invention provides a bicomponent fiber comprising a sheath, where the sheath includes a propylene-based elastomer, said propylene-based elastomer including propylene-derived units and from about 3.0 to about 15 wt % alpha-olefin-derived units other than propylene-derived units, based upon the entire weight of the copolymer, said propylene-based elastomer having a triad tacticity of greater than 75%, and a heat of fusion, as determined by DSC, of less than 75 J/g; and a core, where the melt temperature of the core, as determined by DSC, is at least 5% greater than the melt temperature of the sheath.

One or more embodiments of the present invention further provides a nonwoven fabric comprising a bicomponent fiber including a core and sheath, where the sheath includes a propylene-based elastomer that includes propylene-derived units and from about 3.0 to about 15 wt % alpha-olefin-derived units, based upon the entire weight of the copolymer, has a triad tacticity of greater than 75%, and a heat of fusion, as determined by DSC, of from about 30 to about 75 J/g.

One or more embodiments of the present invention further provides a process for forming bicomponent polymer fibers, the process comprising extruding first and second polymeric compositions to thereby form a sheath-core structure, where the first polymeric composition forms the sheath and the second polymeric composition forms the core, where the first polymeric composition includes a propylene-based polymer and from about 3 to about 15 wt % alpha-olefin-derived units, has a triad tacticity greater than about 75%, and a heat of fusion less than about 75 J/g.

One or more embodiments of the present invention further provides a process for forming an air-through nonwoven fabric, the process comprising (i) providing bicomponent fiber including a sheath, where the sheath includes a propylene-based elastomer, said propylene-based elastomer including propylene-derived units and from about 3.0 to about 15 wt % alpha-olefin-derived units other than propylene-derived units, based upon the entire weight of the copolymer, said propylene-based elastomer having a triad tacticity of greater than 75%, and a heat of fusion, as determined by DSC, of less than 75 J/g, and a core, where the melt temperature of the core, as determined by DSC, is at least 5% greater than the melt temperature of the sheath; (ii) forming fibers into a web of the fibers; and (iii) exposing the web to air having a temperature from 100 C° to 120 C° to thereby bond the fibers within the web.

DETAILED DESCRIPTION OF ILLUSTRATIVE EMBODIMENTS

Introduction

Embodiments of the invention are based, at least in part, on the discovery of bicomponent polymeric fibers having a core and sheath, where the sheath includes a propylene-based elastomer. In one or more embodiments, the core includes a polymer having a higher flexural modulus and higher melt temperature than the propylene-based elastomer. While bicomponent fibers have been produced using polyethylene in the sheath, it has now been discovered that polyethylene gives rise to several disadvantages including gelling during the spinning process, limited temperature windows in which the fabrics can be bonded, limited tensile strength of the bonded fabric, and the inability to recycle the fibers. In contrast, the present invention employs propylene-based elastomer in the sheath, which advantageously provides for less gelling during the spinning process, lower-bonding temperature, higher tensile strength when bonded, and the ability to recycle the fabric. One or more of these advantages can be attributed to the lower melt temperature of the propylene-based elastomer, the higher tensile strength of the propylene-based elastomer, and the compatibility that exists between the propylene-based elastomer and useful core polymers, especially polypropylene. Additionally, the propylene-based elastomer has been found to offer good hand feel to the finished product. Accordingly, embodiments of the invention are directed toward multicomponent fibers, such as bicomponent fibers, and methods for producing these fibers, where the sheath includes propylene-based elastomer.

Fiber Structure

For purposes of this specification, the term "fiber," which may be used interchangeably with the terms "filament" or "monofilament," refers to a structure whose length is substantially greater than its diameter or breadth. In or more embodiments, the fibers of the present invention have an average diameter of from about 0.1 to about 250 m, in other embodiments from about 0.3 to about 150 m, in other embodiments from about 15 to about 30 m, and in other embodiments from about 18 to about 30 m. In these or other embodiments, the fibers of the present invention have an aspect ratio of from about 0.5 to about 100 m, and in other embodiments from about 1 to about 40 m.

For purposes of this specification, a "bicomponent fiber" is a multicomponent fiber including two or more polymer domains. In one or more embodiments, the bicomponent fibers of the present invention include a first polymer domain forming a sheath and a second polymer domain forming a core of the fiber (i.e. a sheath-core arrangement). In one or more embodiments, the core-sheath arrangement of the fibers of the present invention is concentric, which refers to a sheath and core that share the same center, or it may be eccentric, which refers to a sheath and the core that have different centers, or it may be multi-lobal, which refers to a cross-sectional structure that includes three or more lobes with the core being encased by the sheath in each lobe. In one or more embodiments, the sheath completely encases the core at cross-sections along the length of the fiber (e.g. the sheath forms a annulus around a circular core).

In one or more embodiments, the fibers of the present invention may be characterized by the ratio of the average cross-sectional area of the core to the average cross-sectional area of the sheath. In one or more embodiments, the ratio of the average cross-sectional area of the core to the average cross-sectional area of the sheath is from about 1:9 to about 9:1, in other embodiments from about 1:5 to about 5:1, and in other embodiments from about 2:1 to about 1:2.

In one or more embodiments, the bicomponent fibers of the present invention may be characterized by the weight ratio of the sheath polymer to the core polymer. In one or more embodiments, the ratio of the weight of the core to the weight of the sheath may be from about 5:95 to about 95:5, in other embodiments from about 10:90 to about 90:10, in other embodiments from about 20:80 to about 80:20, in other embodiments from about 30:70 to about 70:30, and in other embodiments from about 40:60 to about 60:40.

In one or more embodiments, the sheath and the core, individually and irrespective of each other, may be "mono-constituent," which refers to the presence of a single polymeric species, or they may be "bi-constituent," which refers to a blend of two or more distinct polymeric species. For purposes of this specification, distinct polymeric species refers to polymers that are compositionally distinct (e.g. different type or amount of polymeric units) or that are structurally distinct (e.g. differ in molecular weight or molecular architecture).

In one or more embodiments, the fibers of the present invention may be characterized by fiber tenacity, which is the force/denier of a fiber bundle (72-fibers per bundle) and is reported in grams/denier. Fiber tenacity, as described herein, is measured using a Textechno Statimat M S/N 23523, CRE loaded with a Textechno program FPAM0210E. These Textechno products are commercially available from Textechno Herbert Stein GmbH & Co. located in M5nchengladbach, Germany. To test the fibers, a fiber bundle is threaded through ceramic guides on the Statimat M into a pneumatic clamp. The gage length for the fiber bundles being tested is 100 mm. Each fiber bundle is pulled at 1270 mm/min until it fails. The force to pull the fiber bundle and the strain of the fiber bundle are recorded until failure occurs.

In one or more embodiments, the fibers of the present invention have a fiber tenacity of greater than 1.70 g/den, in other embodiments greater than 1.90 g/den, in other embodiments greater than 2.00 g/den, in other embodiments greater than 2.15 g/den, in other embodiments greater than 2.30 g/den, in other embodiments greater than 2.50 g/den, in other embodiments greater than 2.55 g/den, and in other embodiments greater than 2.65 g/den. In one or more embodiments, the fibers of the present invention have a fiber tenacity from about 1.70 g/den to about 5.00 g/den, in other embodiments about 2.15 g/den to about 4.50 g/den, and in other embodiments about 2.50 g/den to about 4.00 g/den.

Sheath Composition

In one or more embodiments, the sheath of the bicomponent fibers of the present invention is formed from a composition that includes a propylene-based elastomer. In one or more embodiments, the sheath is bi-constituent. In one or more embodiments, the sheath may include a blend of a propylene-based elastomer and a second polymer that is not a propylene-based elastomer. In these embodiments, the sheath includes greater than 60 wt %, in other embodiments greater than 80 wt %, and in other embodiments greater than 95 wt % propylene-based elastomer, based upon the entire weight of the sheath. In particular embodiments, the sheath consists essentially of propylene-based elastomer whereby the sheath is devoid of other polymer that would have an appreciable impact on the sheath. In particular embodiments, the sheath consists of propylene-based elastomer.

In one or more embodiments, the sheath may include first and second propylene-based elastomers. These embodiments may be described with reference to the relative weight of each of the respective propylene-based elastomers. In one or more embodiments, the sheath includes greater than 65 wt %, in other embodiments greater than 70 wt %, and in other embodiments greater than 75 wt % of the first propylene-based copolymer, based upon the total weight of the propylene based elastomer (e.g. the first and second propylene-based elastomers) with the balance including distinct propylene-based elastomer (e.g. the second propylene-based elastomer). In these or other embodiments, the sheath includes less than 100 wt %, in other embodiments less than 98 wt %, and in other embodiments less than 90 wt % of the first propylene-based copolymer, based upon the total weight of the propylene based elastomer (e.g. the first and second propylene-based elastomers) with the balance including distinct propylene-based elastomer (e.g. the second propylene-based elastomer). In one or more embodiments, the sheath includes from about 65 to about 100 wt %, in other embodiments from about 70 to about 98 wt %, and in other embodiments from about 75 to about 90 wt % of the first propylene-based copolymer, based upon the total weight of the propylene based elastomer (e.g. the first and second propylene-based elastomers) with the balance including distinct propylene-based elastomer (e.g. the second propylene-based elastomer).

First Propylene-Based Elastomer

Generally, the propylene-based elastomers are copolymers including propylene-derived units and alpha-olefin-derived units. In other words, the propylene-based elastomers are prepared from the polymerization of propylene and at least one alpha-olefin monomer other than propylene, which alpha-olefins include ethylene. For purposes of this specification, alpha-olefin monomer other than propylene includes ethylene and C4 (i.e. butene) or higher alpha-olefin. In particular embodiments, the propylene-based elastomers are prepared from the polymerization of propylene and ethylene. In this regard, the embodiments described below may be discussed with reference to ethylene as the alpha-olefin comonomer, but the embodiments are equally applicable to other propylene-based elastomers with other alpha-olefin-derived units. Also, while only certain embodiments include a first and second propylene-based elastomer within the sheath, unless otherwise stated, reference will be made to "first propylene-based elastomer" even for those embodiments that include only one propylene-based elastomer.

Propylene-based elastomers can be characterized by comonomer content, which as described below, can be determined by 4D GPC analysis.

In one or more embodiments, the first propylene-based elastomer includes propylene-derived units and greater than 3.0 wt %, in other embodiments greater than 3.5 wt %, in other embodiments greater than 3.8 wt %, and in other embodiments greater than 4.0 wt % ethylene-derived units, based upon the entire weight of the copolymer (i.e. the total weight of the propylene-derived and ethylene-derived units). In these or other embodiments, the first propylene-based elastomer includes propylene-derived units and less than 15 wt %, in other embodiments less than 10 wt %, in other embodiments less than 8 wt %, and in other embodiments less than 6 wt % ethylene-derived units, based upon the entire weight of the copolymer. In one or more embodiments, the first propylene-based elastomer includes propylene-derived units and from about 3.0 to about 15 wt %, in other embodiments from about 3.5 to about 10 wt %, in other embodiments from about 3.8 to about 8 wt %, and in other embodiments from about 4.0 to about 6 wt % ethylene-derived units, based upon the entire weight of the copolymer. As the skilled person will appreciate, the amount of the alpha-olefin-derived units can be determined by GPC analysis as described herein.

Propylene-based elastomers can be characterized by a melting point (Tm), which can be determined by differential scanning calorimetry (DSC), where the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

As used within this specification, conventional DSC procedures are used for determining Tm and Hf. For example, the following procedure can be used. The elastomer is pressed at a temperature of from about 200 to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0 and about 200° C., is measured in Joules, and is a measure of the Hf of the polymer.

Alternatively, the following procedure can be employed. About 0.5 grams of polymer is weighed out and pressed to a thickness of about 15-20 mils (about 381-508 microns) at about 140° C.-150° C., using a "DSC mold" and Mylar™ as a backing sheet. The pressed pad is allowed to cool to ambient temperature by hanging in air (the Mylar was not removed). The pressed pad is annealed at room temperature (about 23° C.-25° C.) for about 8 days. At the end of this period, an about 15-20 mg disc is removed from the pressed pad using a punch die and placed in a 10 microliter aluminum sample pan. The sample is placed in a differential scanning calorimeter (Perkin Elmer Pyris 1 Thermal Analysis System) and cooled to about −100° C. The sample is heated at about 10° C./min to attain a final temperature of about 165° C. The thermal output, recorded as the area under the melting peak of the sample, is a measure of the heat of fusion and can be expressed in Joules per gram (J/g) of polymer and automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In one or more embodiments, the melt temperature (Tm) of the first propylene-based elastomer (as determined by DSC) is less than 120° C., in other embodiments less than 115° C., in other embodiments less than 110° C., and in other embodiments less than 105° C. In one or more embodiments, the Tm of the first propylene-based elastomer is from about 85 to about 120° C., in other embodiments from about 90 to about 115° C., and in other embodiments from about 95 to about 110° C.

Propylene-based elastomers can be characterized by a heat of fusion (Hf), which can be determined by DSC.

In one or more embodiments, the first propylene-based elastomer may be characterized by its heat of fusion (Hf), as determined by DSC of greater than 0.5 J/g, in other embodiments greater than 3.0 J/g, in other embodiments greater than 6.0 J/g, in other embodiments greater than 10 J/g, in other embodiments greater than 15 J/g, in other embodiments greater than 20 J/g, and in other embodiments greater than 30 J/g. In these or other embodiments, the first propylene-based elastomer may be characterized by an Hf of less than about 80 J/g, in other embodiments less than 75 J/g, in other embodiments less than 70 J/g, in other embodiments less than 65 J/g, and in other embodiments less than 60 J/g. In one or more embodiments, the first propylene-based elastomer has an Hf of from about 30 to about 75 J/g, in other embodiments from about 6 to about 70 J/g, and in other embodiments from about 10 to about 60 J/g.

Propylene-based elastomers can be characterized by a triad tacticity of three propylene-derived units, as measured by $^{13}C$ NMR according to the methods described in U.S. Patent Application Publication No. 2004/0236042.

In one or more embodiments, the first propylene-based elastomer has a triad tacticity of greater than 75%, in other embodiments greater than 80%, in other embodiments greater than 85%, in other embodiments greater than 90%, in other embodiments greater than 92%, in other embodiments greater than 95%, and in other embodiments greater than 97%. In one or more embodiments, the triad tacticity of the first propylene-based elastomer may range from about 75 to about 99%, in other embodiments from about 80 to about 99%, in other embodiments from about 85 to about 99%, in other embodiments from about 90 to about 99%, in other embodiments from about 90 to about 97%, and in other embodiments from about 80 to about 97%.

Propylene-based elastomers can be characterized by a tacticity index (m/r), which is determined by $^{13}$C nuclear magnetic resonance ("NMR"), where the tacticity index (m/r) is calculated as defined by H. N. Cheng in 17 MACROMOLECULES, pp. 1950-1955 (1984). The designation "m" or "r" describes the stereochemistry of pairs of contiguous propylene groups, where "m" refers to meso and "r" refers to racemic. As the skilled person appreciates, an m/r ratio of 1.0 generally describes a syndiotactic polymer, and an m/r ratio of 2.0 generally describes an atactic material. An isotactic material theoretically may have a ratio approaching infinity, and many by-product atactic polymers have sufficient isotactic content to result in ratios of greater than 50.

In one or more embodiments, the first propylene-based elastomer may have a tacticity index (m/r) of greater than 4 or in other embodiments greater than 6. In these or other embodiments, the first propylene-based elastomer may have a tacticity index (m/r) of less than 12, in other embodiments less than 10, or in other embodiments less than 8.

Propylene-based elastomers can be characterized by crystallinity, which may be determined by DSC procedures, where the Hf of a sample of the propylene-based elastomer is divided by the Hf of a 100% crystalline polymer, which is assumed to be 189 joules/gram for isotactic polypropylene or 350 joules/gram for polyethylene.

In one or more embodiments, the first propylene-based elastomer may have a crystallinity of from about 0.5% to about 40%, in other embodiments from about 1% to about 30%, and in other embodiments from about 5% to about 25%.

Propylene-based elastomers can be characterized by density, which is measured at room temperature according to ASTM D-792.

In one or more embodiments, the first propylene-based elastomer may have a density of from about 0.85 g/cm$^3$ to about 0.92 g/cm$^3$, in other embodiments from about 0.86 g/cm$^3$ to about 0.90 g/cm$^3$, and in other embodiments from about 0.86 g/cm$^3$ to about 0.89 g/cm$^3$.

Propylene-based elastomers can be characterized by melt flow rate (MFR), which is measured according to ASTM D-1238, 2.16 kg weight @230° C.

In one or more embodiments, the first propylene-based elastomer may have an MFR of greater than 6 g/10 min, in other embodiments greater than 8 g/10 min, in other embodiments greater than 10 g/10 min, in other embodiments greater than about 12 g/10 min, and in other embodiments greater than 15 g/10 min. In the same or other embodiments, the first propylene-based polymer may have an MFR of less than 55 g/10 min, in other embodiments less than about 50 g/10 min, in other embodiments less than about 45 g/10 min, in other embodiments less than about 35 g/10 min, and in other embodiments less than about 30 g/10 min. In these or other embodiments, the first propylene-based polymer may have an MFR from about 6 to about 55 g/10 min, in other embodiments from about 8 to about 50 g/10 min, and other embodiments from about 10 to about 45 g/10 min.

Propylene-based elastomers may be characterized by molecular weight moments and branching index (g').

Unless otherwise indicated, the distribution and the moments of molecular weight (Mp, Mw, Mn, Mz, Mw/Mn, etc.), the comonomer content (C2, C3, C6, etc.), and the branching index (g') are determined by using a high temperature Gel Permeation Chromatography (Polymer Char GPC-IR) equipped with a multiple-channel band-filter based Infrared detector IR5, an 18-angle light scattering detector and a viscometer (which may be referred to as 4D GPC analysis). Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. Given amount of polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most polyethylene samples or 2 hours for polypropylene samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10 M gm/mole. The MW at each elution volume is calculated with following equation:

$$\log M = \frac{\log (K_{PS}/K)}{\alpha + 1} + \frac{\alpha_{PS} + 1}{\alpha + 1} \log M_{PS}$$

where the variables with subscript "PS" stand for polystyrene while those without a subscript are for the test samples. In this method, $\alpha_{PS}$=0.67 and $K_{PS}$=0.000175, while a and K for other materials are as calculated and published in literature (Sun, T. et al. Macromolecules 2001, 34, 6812), except that for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and a is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to CH$_2$ and CH$_3$ channel calibrated with a series of PE and PP homo/copolymer standards whose nominal value are predetermined by NMR or FTIR. In particular, this provides the methyls per 1000 total carbons ($CH_3/1000TC$) as a function of molecular weight. The short-chain branch (SCB) content per 1000TC (SCB/1000TC) is then computed as a function of molecular weight by applying a chain-end correction to the $CH_3/1000TC$ function, assuming each chain to be linear and terminated by a methyl group at each end. The weight % comonomer is then obtained from the following expression in which f is 0.3, 0.4, 0.6, 0.8, and so on for C3, C4, C6, C8, and so on co-monomers, respectively:

$$w2 = f*SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_2 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $$w2b = f*\text{bulk } CH3/1000TC$$

$$\text{bulk } SCB/1000TC = \text{bulk } CH3/1000TC - \text{bulk } CH3end/1000TC$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (Light Scattering from Polymer Solutions; Huglin, M. B., Ed.; Academic Press, 1972.):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1-0.00126*w2) ml/mg and $A_2$=0.0015 where w2 is weight percent butane.

For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight ($M_v$) as the polymer. $\eta_l = KW_v^\alpha$, K and $\alpha$ are measured values for linear polymers and should be obtained on the same instrument as the one used for the g' index measurement.

Reference can be made to U.S. Pat. No. 6,525,157, whose test methods are also fully applicable for the various measurements referred to in this specification and claims and which contain more details on GPC measurements, the determination of ethylene content by NMR and the DSC measurements.

In one or more embodiments, the first propylene-based elastomer can have a weight average molecular weight (Mw) of from about 100,000 to about 500,000 g/mol, in other embodiments from about 125,000 to about 400,000 g/mol, in other embodiments from about 150,000 to about 300,000 g/mol, and in other embodiments from about 175,000 to about 250,000 g/mol. In one or more embodiments, the first propylene-based elastomer can have a number average molecular weight (Mn) of from about 50,000 to about 250,000 g/mol, in other embodiments from about 60,000 to about 200,000 g/mol, in other embodiments from about 70,000 to about 150,000 g/mol, and in other embodiments from about 80,000 to about 125,000 g/mol. In one or more embodiments, the first propylene-based elastomer hay have a molecular weight distribution (Mw/Mn) of from about 0.5 to about 5.0, in other embodiments from about 1.0 to about 4.0, in other embodiments from about 1.5 to about 3.5, and in other embodiments from about 2.0 to about 3.0.

In one or more embodiments, the first propylene-based elastomer may have a g' index value of 0.95 or greater, or at least 0.97, or at least 0.99, wherein g' is measured at the Mw of the polymer using the intrinsic viscosity of isotactic polypropylene as the baseline.

Propylene-based elastomers may be characterized by a flexural modulus, which may also be referred to as 1% secant modulus, which is determined according to ASTM D-790.

In one or more embodiments, the flexural modulus of the first propylene-based elastomer is less than 1,000 MPa, in other embodiments less than 800 MPa, in other embodiments less than 600 MPa, and in other embodiments less than 500 MPa. In these or other embodiments, the flexural modulus of the first propylene-based elastomer is greater than 100 MPa, in other embodiments greater than 200 MPa, and in other embodiments greater than 300 MPa. In one or more embodiments, the flexural modulus of the first propylene-based elastomer is from about 100 to 1,000 MPa, in other embodiments from about 200 to 800 MPa, and in other embodiments from about 300 to 600 MPa.

Second Propylene-Based Elastomer

As indicated above, in certain embodiments, the sheath includes a second propylene-based elastomer, which elastomer may also be referred to as flowability modifier. Generally, this second propylene-based elastomer is characterized by having a lower molecular weight, lower viscosity, and/or a higher melt flow rate than that first propylene-based elastomer, and as a result, the composition for forming the sheath has an overall lower melt temperature and thereby the extruding conditions relative to the sheath are less energy intensive. In one or more embodiments, besides the following characteristics, the second propylene-based elastomer can be characterized as set forth above with respect to the first propylene-based elastomer.

In one or more embodiments, the second propylene-based elastomer may have a melt flow rate (MFR), as measured according to ASTM D-1238, 2.16 kg weight @230° C., of greater than 6 g/10 min, in other embodiments greater than 12 g/10 min, in other embodiments greater than 20 g/10 min, in other embodiments greater than 30 g/10 min, and in other embodiments greater than 35 g/10 min. In the same or other embodiments, the second propylene-based polymer may have an MFR of less than 80 g/10 min, in other embodiments less than 70 g/10 min, in other embodiments less than 60 g/10 min, in other embodiments less than 50 g/10 min, and in other embodiments less than 40 g/10 min. In one or more embodiments, the second propylene-based polymer may have an MFR from about 6 to about 80 g/10 min, in other embodiments from about 12 to about 70 g/10 min, and other embodiments from about 20 to about 60 g/10 min.

In one or more embodiments, the second propylene-based copolymer can have a weight average molecular weight (Mw) of from about 10,000 to about 99,000 g/mol, in other embodiments from about 12,000 to about 80,000 g/mol, in other embodiments from about 15,000 to about 50,000 g/mol, and in other embodiments from about 20,000 to about 40,000 g/mol. In one or more embodiments, the second propylene-based copolymer can have a number average molecular weight (Mn) of from about 2,500 to about 49,000 g/mol, in other embodiments from about 5,000 to about 40,000 g/mol, in other embodiments from about 7,500 to about 25,000 g/mol, and in other embodiments from about 10,000 to about 20,000 g/mol. In one or more embodiments, the second propylene-based elastomer hay have a molecular weight distribution (Mw/Mn) of from about 0.5 to about 5.0, in other embodiments from about 1.0 to about 4.0, in other embodiments from about 1.5 to about 3.5, and in other embodiments from about 2.0 to about 3.0.

In one or more embodiments, the second propylene-based elastomer may be characterized by its heat of fusion (Hf), as determined by DSC of greater than 0.5 J/g, in other embodiments greater than 1.0 J/g, in other embodiments greater than 1.5 J/g, in other embodiments greater than 3.0 J/g, in other embodiments greater than 4.0 J/g, in other embodiments greater than 6.0 J/g, and in other embodiments greater than 10 J/g. In these or other embodiments, the second propylene-based elastomer may be characterized by an Hf of less than 65 J/g, in other embodiments less than 60 J/g, in other embodiments less than 55 J/g, in other embodiments less than 50 J/g, in other embodiments less than 45 J/g, and in other embodiments less than 40 J/g. In one or more embodiments, the second propylene-based elastomer has an Hf of from about 0.5 to about 65 J/g, in other embodiments from about 1.5 to about 55 J/g, and in other embodiments from about 3.0 to about 45 J/g.

In one or more embodiments, the Tm of the second propylene-based elastomer (as determined by DSC) is less than 120° C., in other embodiments less than 115° C., in other embodiments less than 110° C., and in other embodiments less than 105° C. In one or more embodiments, the Tm of the second propylene-based elastomer is from about 85 to about 120° C., in other embodiments from about 90 to about 115° C., and in other embodiments from about 95 to about 110° C.

In one or more embodiments, the second propylene-based elastomer may be characterized by a flexural modulus, which may also be referred to as 1% secant modulus, which is determined according to ASTM D-790. In one or more embodiments, the flexural modulus of the second propylene-based elastomer is less than 800 MPa, in other embodiments less than 600 MPa, in other embodiments less than 400 MPa, and in other embodiments less than 300 MPa. In these or other embodiments, the flexural modulus of the second propylene-based elastomer is greater than 50 MPa, in other embodiments greater than 100 MPa, in other embodiments greater than 150 MPa, and in other embodiments greater than 200 MPa. In one or more embodiments, the flexural modulus of the second propylene-based elastomer is from about 50 to 800 MPa, in other embodiments from about 100 to 600 MPa, and in other embodiments from about 150 to 400 MPa.

Characteristics of Overall Sheath Composition

Embodiments of the invention can be described with reference to the overall characteristics of the sheath composition, which as explained above may include a single polymeric species or multiple polymeric species.

In one or more embodiments, the sheath composition may be characterized by a flexural modulus, which may also be referred to as 1% secant modulus, which is determined according to ASTM D-790. In one or more embodiments, the flexural modulus of the sheath composition is less than 1,000 MPa, in other embodiments less than 800 MPa, in other embodiments less than 600 MPa, and in other embodiments less than 500 MPa. In these or other embodiments, the flexural modulus of the sheath composition is greater than 100 MPa, in other embodiments greater than 200 MPa, and in other embodiments greater than 300 MPa. In one or more embodiments, the flexural modulus of the sheath composition is from about 100 to 1,000 MPa, in other embodiments from about 200 to 800 MPa, and in other embodiments from about 300 to 600 MPa.

The sheath composition may be characterized by a melt temperature (Tm) as determined by DSC. In one or more embodiments, the sheath composition may have a Tm of less than 120° C., in other embodiments less than 115° C., in other embodiments less than 110° C., and in other embodiments less than 105° C. In one or more embodiments, the Tm of the sheath composition is from about 85 to about 120° C., in other embodiments from about 90 to about 115° C., and in other embodiments from about 95 to about 110° C.

The sheath composition may be characterized by melt flow rate (MFR). In one more embodiments, the sheath composition may have a melt flow rate (MFR), as measured according to ASTM D-1238, 2.16 kg weight @230° C., of greater than 15 g/10 min, in other embodiments greater than 20 g/10 min, in other embodiments greater than 30 g/10 min, and in other embodiments greater than 35 g/10 min. In the same or other embodiments, the sheath composition may have an MFR of less than 60 g/10 min, in other embodiments less than 50 g/10 min, in other embodiments less than 45 g/10 min, and in other embodiments less than 40 g/10 min. In one or more embodiments, the sheath composition may have an MFR from about 15 to about 60 g/10 min, in other embodiments from about 20 to about 50 g/10 min, and other embodiments from about 30 to about 40 g/10 min.

The sheath composition may be characterized by total ethylene-derived units (which may be included in one or more polymeric species), where the amount of ethylene-derived units is be determined by GPC analysis as described herein. In one or more embodiments, the sheath composition includes greater than 3.0 wt %, in other embodiments greater than 3.5 wt %, in other embodiments greater than 3.8 wt %, and in other embodiments greater than 4.0 wt % ethylene-derived units, based upon the entire weight of the polymeric content of the sheath composition. In these or other embodiments, the sheath composition includes less than 30 wt %, in other embodiments less than 25 wt %, in other embodiments less than 20 wt %, in other embodiments less than 15 wt %, in other embodiments less than 12 wt %, in other embodiments less than 10 wt %, and in other embodiments less than 8 wt % ethylene-derived units, based upon the entire weight of the polymeric content of the sheath composition. In one or more embodiments, the sheath composition includes from about 3.0 to about 30 wt %, in other embodiments from about 3.5 to about 25 wt %, in other embodiments from about 3.8 to about 20 wt %, and in other embodiments from about 4.0 to about 15 wt % ethylene-derived units, based upon the entire weight of the polymeric content of the sheath composition.

Preparation of Propylene-Based Elastomers

In one or more embodiments, the propylene-based elastomer employed in this invention can be prepared by reacting monomers in the presence of a catalyst system described herein at a temperature of from 0° C. to 200° C. for a time of from 1 second to 10 hours. In particular embodiments, homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction can be removed by cooling of the polymerization feed and allowing the polymerization to heat up to the polymerization, although internal cooling systems may be used. Further description of exemplary methods suitable for preparation of the propylene-based elastomer described herein may be found in U.S. Pat. No. 6,881,800, which is incorporated by reference herein for purposes of U.S. practice.

The triad tacticity and tacticity index of the propylene-based copolymer may be controlled by the catalyst, which influences the stereoregularity of propylene placement, the polymerization temperature, according to which stereoregularity can be reduced by increasing the temperature, and by the type and amount of a comonomer, which tends to reduce the level of longer propylene derived sequences.

The catalyst may also control the stereoregularity in combination with the comonomer and the polymerization temperature. The propylene-based elastomers described herein are prepared using one or more catalyst systems. As used herein, a "catalyst system" includes at least a transition metal compound, also referred to as catalyst precursor, and an activator. Contacting the transition metal compound (catalyst precursor) and the activator in solution upstream of the polymerization reactor or in the polymerization reactor of the disclosed processes yields the catalytically active component (catalyst) of the catalyst system. Any given transition metal compound or catalyst precursor can yield a catalytically active component (catalyst) with various activators, affording a wide array of catalysts deployable in the processes. Catalyst systems may include at least one transition metal compound and at least one activator. However, catalyst systems may also comprise more than one transition metal compound in combination with one or more activators. These catalyst systems may optionally include impurity scavengers. Each of these components is described in further detail below.

In one or more embodiments, the catalyst systems used for producing propylene-based elastomers includes a metallocene compound. In some embodiments, the metallocene compound is a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. Exemplary metallocene compounds of this type include, but are not limited to, μ-dimethylsilylbis(indenyl)hafniumdimethyl and -dimethylsilylbis(indenyl)zirconiumdimethyl.

In other embodiments, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ are substituted in the 2 position by a methyl group and in the 4 position by a substituent selected from the group consisting of $C_5$ to $C_{15}$ aryl, $C_6$ to $C_{25}$ alkylaryl, and N- or P-containing alkyl or aryl. Exemplary metallocene compounds of this type include, but are not limited to, (μ-dimethylsilyl)bis(2-methyl-4-(3,'5'-di-tert-butylphenyl)indenyl)zirconiumdimethyl, (μ-dimethylsilyl)bis(2-methyl-4-(3,'5'-di-tert-butylphenyl)indenyl)hafnium-dimethyl, (μ-dimethylsilyl)bis(2-methyl-4-naphthylindenyl)zirconiumdimethyl, (μ-dimethylsilyl)bis(2-methyl-4-naphthylindenyl)hafniumdimethyl, (μ-dimethylsilyl)bis(2-methyl-4-(N-carbazyl)indenyl)zirconiumdimethyl, and (μ-dimethylsilyl)bis(2-methyl-4-(N-carbazyl)indenyl)hafniumdimethyl.

Alternatively, in one or more embodiments, the metallocene compound may correspond to one or more of the formulas disclosed in U.S. Pat. No. 7,601,666. These metallocene compounds include, but are not limited to, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)hafnium dimethyl, diphenylsilyl bis(5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)zirconium dichloride, and cyclo-propylsilyl bis(2-(methyl)-5,5,8,8-tetramethyl-5,6,7,8-tetrahydrobenz(f)indenyl)hafnium dimethyl.

In one or more embodiments of the present invention, the activators of the catalyst systems used to produce propylene-based elastomers comprise a cationic component. In some embodiments, the cationic component has the formula $[R^1R^2R^3AH]^+$, where A is nitrogen, $R^1$ and $R^2$ are together a —$(CH_2)_a$— group, where a is 3, 4, 5 or 6 and form, together with the nitrogen atom, a 4-, 5-, 6- or 7-membered non-aromatic ring to which, via adjacent ring carbon atoms, optionally one or more aromatic or heteroaromatic rings may be fused, and $R^3$ is $C_1$, $C_2$, $C_3$, $C_4$ or $C_5$ alkyl, or N-methylpyrrolidinium or N-methylpiperidinium. In other embodiments, the cationic component has the formula $[RAH]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

In one or more embodiments, the activators of the catalyst systems used to produce the propylene-based elastomers comprise an anionic component, $[Y]^-$. In some embodiments, the anionic component is a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. In one or more embodiments, the substituents are perhalogenated aryl groups, or perfluorinated aryl groups, including but not limited to perfluorophenyl, perfluoronaphthyl and perfluorobiphenyl.

Together, the cationic and anionic components of the catalysts systems described herein form an activator compound. In one or more embodiments, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl) borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

Any catalyst system resulting from any combination of a metallocene compound, a cationic activator component, and an anionic activator component mentioned in the preceding paragraphs shall be considered to be explicitly disclosed herein and may be used in accordance with the present invention in the polymerization of one or more olefin monomers. Also, combinations of two different activators can be used with the same or different metallocene(s).

Suitable activators also include alominoxanes (or alumoxanes) and aluminum alkyls. Without being bound by theory, an alumoxane is typically believed to be an oligomeric aluminum compound represented by the general formula $(R^X-Al-O)_n$, which is a cyclic compound, or $R^X(R^X-Al-O)AlR^X_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In one or more embodiments, $R^X$ is methyl and n is at least 4. Methyl alumoxane (MAO), as well as modified MAO containing some higher alkyl groups to improve solubility, ethyl alumoxane, iso-butyl alumoxane, and the like are useful for the processes disclosed herein.

Further, catalyst systems may contain, in addition to the transition metal compound and the activator described above, additional activators (co-activators) and/or scavengers. A co-activator is a compound capable of reacting with the transition metal complex, such that when used in combination with an activator, an active catalyst is formed. Co-activators include alumoxanes and aluminum alkyls.

In some embodiments, scavengers may be used to "clean" the reaction of any poisons that would otherwise react with the catalyst and deactivate it. Typical aluminum or boron alkyl components useful as scavengers are represented by the general formula $R^XJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^X$ or a different univalent anionic ligand such as halogen (Cl, Br, I), alkoxide (OR) and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum and combinations thereof. Exemplary boron alkyls include triethylboron. Scavenging compounds may also be alumoxanes and modified alumoxanes including methylalumoxane and modified methylalumoxane.

In some embodiments, the catalyst system used to produce the propylene-based elastomers include a transition metal component which is a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. In one or more embodiments, the transition metal component used to produce the propylene-based polymers is μ-dimethylsilylbis(indenyl)hafniumdimethyl.

Core Composition

As indicated above, the core includes one or more polymers (i.e. core polymer) that provide the core composition with a higher melt temperature and higher flexural modulus as compared to the sheath composition.

In one or more embodiments, the core composition is characterized by having a flexural modulus, as defined by ASTM D-790, that is at least 5%, in other embodiments at least 10%, in other embodiments at least 15%, in other embodiments at least 20%, in other embodiments at least 30%, and in other embodiments at least 40% greater than the flexural modulus of the sheath composition. Stated differently, the core composition is characterized by having a flexural modulus, as defined by ASTM D-790, that is at least 100 MPa, in other embodiments at least 250 MPa, in other embodiments at least 500 MPa, in other embodiments at least 750 MPa, in other embodiments at least 850 MPa, and in other embodiments at least 950 MPa greater than the flexural modulus of the sheath composition.

In one or more embodiments, the core composition is characterized by having a melt temperature (Tm as determined by DSC) that is at least 5%, in other embodiments at least 10%, in other embodiments at least 15%, in other embodiments at least 20%, in other embodiments at least 30%, and in other embodiments at least 40%, greater than the melt temperature of the sheath composition. Stated differently, the core composition is characterized by having a melt temperature (Tm as determined by DSC) that is at least 15° C., in other embodiments at least 20° C., in other embodiments at least 25° C., in other embodiments at least 30° C., in other embodiments at least 35° C., in other embodiments at least 45° C., in other embodiments at least 55° C. greater than the melt temperature of the sheath composition.

In one or more embodiments, the core composition may be characterized by a flexural modulus, which may also be referred to as 1% secant modulus, which is determined according to ASTM D-790. In one or more embodiments, the flexural modulus of the core composition is greater than 1,000 MPa, in other embodiments greater than 1,200 MPa, and in other embodiments greater than 1,300 MPa. In one or more embodiments, the flexural modulus of the core composition is from about 1,000 to 2,000 MPa, in other embodiments from about 1,200 to 1,800 MPa, and in other embodiments from about 1,300 to 1,500 MPa.

In one or more embodiments, the melt temperature (Tm) of the core composition (as determined by DSC) is greater than 125° C., in other embodiments greater than 140° C., and in other embodiments greater than 150° C. In one or more embodiments, the Tm of the core composition is from about 125 to about 330° C., in other embodiments from about 140 to about 280° C., and in other embodiments from about 150 to about 260° C.

In one or more embodiments, the core composition can include or consist of polymers, such as, but not limited to, propylene-based polymers (e.g., homopolymers, impact copolymers, copolymers), ethylene-based polymers (e.g., LDPE, LLDPE, HDPE (copolymers and block copolymers)), functionalized polyolefins (e.g., Exxelor™. maleic anhydride functionalized elastomeric ethylene copolymers), plastomers (e.g., ethylene-.alpha.-olefin copolymers), polyurethane, polyesters such as polyethylene terephthalate, polylactic acid, polyvinyl chloride, polytetrafluoroethylene, styrenic block copolymers, ethylene vinyl acetate copolymers, polyamide, polycarbonate, cellulosics (e.g., Rayon™, Lyocell™, Tencil™), an elastomer, poly(acetylene), poly(thiophene), poly(aniline), poly(fluorene), poly(pyrrole), poly(3-alkylhiophene), poly(phenylene sulphide), polynaphthalenes, poly(phenylene vinylene), poly(vinylidene fluoride), and blends of any two or more of these materials. Useful polymers also include plastomers (e.g., ethylene-.alpha.-olefin copolymers and block copolymers), polyurethane, polyesters such as polyethylene terephthalate, polylactic acid, polyvinyl chloride, polytetrafluoroethylene, styrenic block copolymers, ethylene vinyl acetate copolymers, polyamide, polycarbonate, cellulosics (e.g., Rayon™, Lyocell™, Tencil™), an elastomer, poly(acetylene), poly(thiophene), poly(aniline), poly(fluorene), poly(pyrrole), poly(3-alkylhiophene), poly(phenylene sulphide), polynaphthalenes, poly(phenylene vinylene), poly(vinylidene fluoride), and blends of any two or more of these materials.

Polyesters

In particular embodiments, polyesters are used in the core of the bicomponent fibers of the present invention. Exemplary polyesters include polyolefin-terephthalates and polyalkylene terephthalates, such as poly(ethylene terephthalate) (PET), poly(butylene terephthalate) (PBT), and poly(cyclohexane dimethylene terephthalate) (PCT).

Propylene-Based Thermoplastics

In particular embodiments, polypropylene-based thermoplastic are used in the core of the bicomponent fibers of the present invention. The polypropylene-based thermoplastics may include propylene homopolymer, or a copolymer of propylene, or some mixture of propylene homopolymers and copolymers. In certain embodiments, the polypropylene described herein is predominately crystalline, thus the polypropylene may have a melting point (Tm) greater than 110° C. or 115° C. or 130° C. The term "crystalline," as used herein, characterizes those polymers which possess high degrees of inter- and intra-molecular order. In certain embodiments the polypropylene has a heat of fusion (Hf) greater than 60 J/g or 70 J/g or 80 J/g, as determined by Differential Scanning Calorimetry (DSC) analysis. The Hf is dependent on the composition of the polypropylene; the thermal energy for the highest order of polypropylene is estimated at 189 J/g that is, 100% crystallinity is equal to a Hf of 189 J/g. A polypropylene homopolymer will have a higher $H_{Hf}$ than a copolymer or blend of homopolymer and copolymer.

In certain embodiments, the polypropylene(s) can be isotactic. Isotacticity of the propylene sequences in the polypropylenes can be achieved by polymerization with the choice of a desirable catalyst composition. The isotacticity of the polypropylenes as measured by $^{13}C$ NMR, and expressed as a meso diad content is greater than 90% (meso diads [m]>0.90) or 95% or 97% or 98% in certain embodiments, determined as in U.S. Pat. No. 4,950,720 by $^{13}C$ NMR. Expressed another way, the isotacticity of the polypropylenes as measured by $^{13}C$ NMR, and expressed as a pentad content, is greater than 93% or 95% or 97% in certain embodiments.

The polypropylene can vary widely in composition. For example, in certain embodiments, substantially isotactic polypropylene homopolymer or in other embodiments propylene copolymer containing equal to or less than 10 wt % of other monomer, that is, at least 90 wt % propylene can be used. Further, the polypropylene can be present in the form of a graft or block copolymer, in which the blocks of polypropylene have substantially the same stereoregularity as the propylene-based elastomer described herein so long as the graft or block copolymer has a sharp melting point above 110° C. or 115° C. or 130° C., characteristic of the stereoregular propylene sequences.

In one or more embodiments, the polypropylene can be a combination of homopolypropylene, and/or random, and/or block copolymers. When the polypropylene is a random copolymer, the percentage of the α-olefin derived units in the copolymer is, in general, up to 5 wt % of the polypropylene, 0.5 wt % to 5 wt % in another embodiment, and 1 wt % to 4 wt % in yet another embodiment. In certain embodiments, the comonomer derived from ethylene or α-olefins containing 4 to 12 carbon atoms. One, two or more comonomers can be copolymerized with propylene. Exemplary α-olefins may be selected from the group consisting of: ethylene; 1-butene; 1-pentene-2-methyl-1-pentene-3-methyl-1-butene; 1-hexene-3-methyl-1-pentene-4-methyl-1-pentene-3,3-dimethyl-1-butene; 1-heptene; 1-hexene; 1-methyl-1-hexene; dimethyl-1-pentene; trimethyl-1-butene; ethyl-1-pentene; 1-octene; methyl-1-pentene; dimethyl-1-hexene; trimethyl-1-pentene; ethyl-1-hexene; 1-methylethyl-1-pentene; 1-diethyl-1-butene; propyl-1-pentene; 1-decene; methyl-1-nonene; 1-nonene; dimethyl-1-octene; trimethyl-1-heptene; ethyl-1-octene; methylethyl-1-butene; diethyl-1-hexene; 1-dodecene; and 1-hexadodcene.

In one or more embodiments, the weight average molecular weight (Mw) of the polypropylene can be between 50,000 g/mol to 3,000,000 g/mol, or from 90,000 g/mol to 500,000 g/mol in another embodiment, with a molecular weight distribution (MWD, Mw/Mn) within the range from 1.5 to 2.5; or 3.0 to 4.0; or 5.0 to 20.0. The polypropylene can have an MFR (2.16 kg/230° C.) ranging of from 10 dg/min to 15 dg/min; or 18 dg/min to 30 dg/min; or 35 dg/min to 45 dg/min; or 40 dg/min to 50 dg/min.

The term "random polypropylene" ("RCP") as used herein broadly means a single phase copolymer of propylene having up to 9 wt %, or 2 wt % to 8 wt % of an alpha olefin comonomer. Exemplary alpha olefin comonomers have 2 carbon atoms, or from 4 to 12 carbon atoms. In certain embodiments, the alpha olefin comonomer is ethylene.

The propylene impact copolymers ("ICP") is heterogeneous and can include a first phase of 70 to 95 wt % homopolypropylene and a second phase of from 5 wt % to 30 wt % ethylene-propylene rubber, based on the total weight of the impact copolymer. The propylene impact copolymer can include 78 wt % to 95 wt % homopolypropylene and from 5 wt % to 22 wt % ethylene-propylene rubber, based on the total weight of the impact copolymer. In certain embodiments, the impact copolymer can include from 90 wt % to 95 wt % homopolypropylene and from 5 wt % to 10 wt % ethylene-propylene rubber, based on the total weight of the impact copolymer.

There is no particular limitation on the method for preparing the polypropylenes described herein. However, for example, the polymer is a propylene homopolymer obtained by homopolymerization of propylene in a single stage or multiple stage reactor. Copolymers may be obtained by copolymerizing propylene and ethylene or an α-olefin having from 4 to 20 carbon atoms in a single stage or multiple stage reactor. Polymerization methods include, but are not limited to, high pressure, slurry, gas, bulk, or solution phase, or a combination thereof, using any suitable catalyst such as traditional Ziegler-Natta catalyst or a single-site, metallocene catalyst system, or combinations thereof including bimetallic (i.e., Ziegler-Natta and metallocene) supported catalyst systems.

Exemplary commercial polypropylenes include the family of Achieve™ polymers (ExxonMobil Chemical Company, Baytown, Tex.). The Achieve polymers are produced using metallocene catalyst systems. In certain embodiments, the metallocene catalyst system produces a narrow molecular weight distribution polymer. The MWD is typically in the range of 1.5 to 2.5. However, a broader MWD polymer may be produced in a process with multiple reactors. Different MW polymers can be produced in each reactor to broaden the MWD. Achieve polymer such as Achieve 3854, a homopolymer having an MFR of 24 dg/min can be used as a blend component described herein. Alternatively, an Achieve polymer such as Achieve 6936G1, a 1550 dg/min MFR homopolymer, can be used as a blend component described herein. Other polypropylene random copolymer and impact copolymer may also be used. The choice of polypropylene MFR can be used as means of adjusting the final MFR of the blend, especially the facing layer composition. Any of the polypropylenes described herein can be modified by controlled rheology to improve spinning performance as is known in the art.

Additives

In one or more embodiments, one or more additives may be incorporated into the sheath, the core, or both the core and the sheath. These additives may include, but are not limited to, stabilizers, antioxidants, fillers, colorants, nucleating agents, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. The antioxidants may include primary and secondary antioxidants such as, for example, hindered phenols, hindered amines, and phosphates. Nucleating agents may include, for example, sodium benzoate and talc. Also, to improve crystallization rates, other nucleating agents may also be employed such as Ziegler-Natta olefin products or other highly crystalline polymers. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

Preparation of Bicomponent Fibers and Fabrics

In one or more embodiments, the bicomponent fibers of the present invention may be prepared in a melt-spun process (i.e. meltspinning), which is a process that extrudes polymeric melts or solutions through spinnerets to form filaments, which may also be referred to as monofilaments. The monofilaments may be formed into a fabric through various techniques including, but not limited to, spunbonding, meltblowing, flash spinning, coforming. In one or more embodiments, the fibers may be stable fibers that are carded.

In one or more embodiments, the sheath-core fibers of the present invention are prepared by a melt-spun process where two polymer liquids are separately supplied to spinneret orifices and then extruded to form the sheath-core structure. In the case of concentric monofilaments, the orifice supplying the core polymer is in the center of the spinning orifice outlet and flow conditions of core polymer fluid are strictly controlled to maintain the concentricity of both components when spinning. Eccentric fiber production can include eccentric positioning of the inner polymer channel and controlling of the supply rates of the two component polymers. Alternatively, a varying element can be introduced near the supply of the sheath component melt. Alternatively, a stream of single component can be merged with a concentric sheath-core component just before emerging from the orifice. Or, spun concentric fiber can be deformed by passing over a hot edge.

In one or more embodiments, the melt-spun process for preparing the bicomponent fibers of the present invention includes formation of a fabric by a spunbonding process. Following extrusion through a spinneret (i.e. meltspinning), the filaments can be quenched with air at a low temperature, drawn, usually pneumatically, and deposited on a moving mat, belt or "forming wire" to form the nonwoven fabric. See, for example, in U.S. Pat. Nos. 4,340,563; 3,692,618; 3,802,817; 3,338,992; 3,341,394; 3,502,763; and 3,542,615. The skilled person understands that process conditions can be altered to tailor fiber and fabric properties. For example, increasing the polymer molecular weight or decreasing the processing temperature results in larger diameter fibers. Changes in the quench air temperature and pneumatic draw pressure also have an affect on fiber diameter.

In one or more embodiments, the melt-spun process for preparing the bicomponent fibers of the present invention includes formation of a fabric by a co-forming process. Following extrusion through a spinneret (i.e. meltspinning), other materials are added to the fabric either within the die or at or near the exit of the die. These other materials may include, but are not limited to, pulp, superabsorbent particles, cellulose or staple fibers. Co-forming processes are described in U.S. Pat. Nos. 4,818,464 and 4,100,324.

In one or more embodiments, the use of the propylene-based elastomer to form the sheath as described herein provides for a process characterized by advantageous melt-spinning speed, which is also referred to as spinning speed, which is measured in distance per unit of time (e.g. meters per minute "m/min') at a given throughput, which is conventionally measured in grams per hole per minute ("ghm"). In one or more embodiments, the fibers of the present invention can be meltspun, at a throughput of 0.6 ghm, at a maximum speed that is greater than 2800 m/min, in other embodiments greater than 3000 m/min, and in other embodiments greater than 3200 m/min. In these or other embodiments, the fibers of the present invention can be meltspun, at a throughput of 0.4 ghm, at a maximum speed that is greater than 2800 m/min, in other embodiments greater than 3000 m/min, and in other embodiments greater than 3200 m/min. In one or more embodiments, fiber production can take place by employing a pack pressure that is less than 600 psi, in other embodiments less than 550 psi, and in other embodiments less than 500 psi at 0.6 ghm.

Fabrics

As noted above, the bicomponent fiber may be used to prepare an air-through nonwoven fabric (i.e. a bonded fabric). In one or more embodiments, a nonwoven web of bicomponent fibers prepared according to this invention are subjected to an air-through bonding process to thereby thermally bond or set the fibers.

In one or more embodiments, the nonwoven fabrics prepared according to the present invention may be characterized by their initial sealing temperature, which may be determined according to ASTM F-2029. The skilled person understands that the sealing temperature impacts the temperature that must be employed to bond the fibers in the preparation of bonded fabrics. In one or more embodiments, the nonwoven fabrics (and/or the fibers) of the present invention have an initial sealing temperature that is less than 140° C., in other embodiments less than 125° C., and in other embodiments less than 110° C. In these or other embodiments, the nonwoven fabrics (and/or the fibers) have an initial sealing temperature that is greater than 70° C., in other embodiments greater than 80° C., and in other embodiments greater than 90° C. In one or more embodiments, the nonwoven fabrics (and/or the fibers) have an initial sealing temperature that is from about 70° C. to about 140° C., in other embodiments from about 80° C. to about 125° C., and in other embodiments from about 95° C. to about 105° C. Stated differently, in preparing bonded fabrics according to aspects of the present invention, the unbonded fabrics are subjected to air-bonding techniques where the temperature of the air is equivalent to the foregoing sealing temperatures.

In one or more embodiments, the nonwoven fabrics prepared using the bicomponent fiber may be characterized by their basis weight, which can be measured according to WSP (Worldwide Strategic Partners) 130.1 (05). In one or more embodiments, the nonwoven fabrics of the present invention may have a basis weight less than 120 $g/m^3$, in other embodiments less than 50 $g/m^3$, and in other embodiments less than 20 $g/m^3$. In these or other embodiments, the nonwoven fabric may have a basis weight greater than 6 $g/m^3$, in other embodiments greater than 10 $g/m^3$, and in other embodiments greater than 15 $g/m^3$. In one or more embodiments, the nonwoven fabric may have a basis weight from about 6 $g/m^3$ to about 120 $g/m^3$, in other embodiments from about 10 $g/m^3$ to about 50 $g/m^3$, and in other embodiments from about 15 $g/m^3$ to about 20 $g/m^3$.

According to one or more embodiment of the invention, the fibers produced according to the process described here are formed into a nonwoven web of the fibers. This nonwoven web is then bonded by employing air-through bonding techniques to thereby form a bonded nonwoven. In one or more embodiments, the air-through bonding techniques include exposing the web to air having a temperature of less than 130 C°, in other embodiments less than 120 C°, in other embodiments less than 115 C°, and in other embodiments less than 110 C°. In one or more embodiments, the nonwoven web is exposed to air at temperatures of from about 90 to about 130 C°, in other embodiments from about 100 to about 120 C°, and in other embodiments from about 105 to about 115 C°.

INDUSTRIAL APPLICABILITY

Fabrics formed from the bicomponent fibers described herein may be a single layer, or may be multilayer laminates. In one or more embodiments, the fabric may include a laminate (or "composite") from meltblown fabric ("M") and spunbond fabric ("S"), which combines the advantages of strength from spunbonded fabric and greater barrier properties of the meltblown fabric. A typical laminate or composite has three or more layers, a meltblown layer(s) sandwiched between two or more spunbonded layers, or "SMS" fabric composites. Examples of other combinations are SSMMSS, SMMS, and SMMSS composites. Composites can also be made of the meltblown fabrics of the invention with other materials, either synthetic or natural, to produce useful articles.

In one or more embodiments, the bicomponent fibers may be used to make fabrics that have a variety of uses including, but not limited to, diapers, feminine care products, and adult incontinence products including components thereof such as the top sheet, back sheet, leg cuffs, elastic waistband, and transfer layers. Also, the fabrics of this invention can be used as nonwoven structures in absorbent cores in wet wipes. Still further, the fabrics of this invention can be used in spunlaced nonwoven products like medical disposable textiles and filtration products.

SPECIFIC EMBODIMENTS

Paragraph A: A bicomponent fiber comprising a sheath, where the sheath includes a propylene-based elastomer, said propylene-based elastomer including propylene-derived units and from about 3.0 to about 15 wt % alpha-olefin-derived units other than propylene-derived units, based upon the entire weight of the copolymer, said propylene-based elastomer having a triad tacticity of greater than 75%, and a heat of fusion, as determined by DSC, of less than 75 J/g; and a core, where the melt temperature of the core, as determined by DSC, is at least 5% greater than the melt temperature of the sheath.

Paragraph B: The bicomponent fiber of Paragraph A, where the melt temperature of the core, as determined by DSC, that is greater than 125° C. and the flexural modulus of the core, as determined by ASTM D-790, is greater than 1,000 MPa.

Paragraph C: The bicomponent fibers of Paragraphs A-B, where the melt temperature of the core is at least 20% greater than the melt temperature of the sheath.

Paragraph D: The bicomponent fibers of Paragraphs A-C, where the melt temperature of the core is at least 15° C. greater than the melt temperature of the sheath.

Paragraph E: The bicomponent fibers of Paragraphs A-D, where the melt temperature of the core is at least 30° C. greater than the melt temperature of the sheath.

Paragraph F: The bicomponent fibers of Paragraphs A-E, where the flexural modulus of the core is at least 1,000 MPa greater than the flexural modulus of the sheath.

Paragraph G: The bicomponent fibers of Paragraphs A-F, where the flexural modulus of the core is at least 1,300 MPa greater than the flexural modulus of the sheath.

Paragraph H: The bicomponent fibers of Paragraphs A-G, where the total ethylene-derived units within the sheath is less than 30 wt % based upon the entire weight of the polymeric content of the sheath.

Paragraph I: The bicomponent fibers of Paragraphs A-H, where the alpha-olefin-derived units are ethylene-derived units, and where the propylene-based elastomer includes less than 8 wt % ethylene-derived units.

Paragraph J: The bicomponent fibers of Paragraphs A-I, where the propylene-based elastomer includes less than 6 wt % ethylene-derived units.

Paragraph K: The bicomponent fibers of Paragraphs A-J, where the sheath has a flexural modulus, according to ASTM D-790, of from about 100 to about 1,000 MPa.

Paragraph L: The bicomponent fibers of Paragraphs A-K, where the sheath has a melt temperature, as determined by DSC, of from about 85 to about 120° C.

Paragraph M: The bicomponent fibers of Paragraphs A-L, where the sheath includes a first propylene-based elastomer and a second propylene-based elastomer, where the first propylene-based elastomer has an MFR, according to ASTM D-1238, 2.16 kg weight @230° C., of from about 6 to about 55 g/10 min, and where the second propylene-based elastomer has an MFR, according to ASTM D-1238, 2.16 kg weight @230° C., of from about 6 to about 80 g/10 min.

Paragraph N: A nonwoven fabric comprising a bicomponent fiber including a core and sheath, where the sheath includes a propylene-based elastomer that includes propylene-derived units and from about 3.0 to about 15 wt % alpha-olefin-derived units, based upon the entire weight of the copolymer, has a triad tacticity of greater than 75%, and a heat of fusion, as determined by DSC, of from about 30 to about 75 J/g.

Paragraph O: The nonwoven fabric of Paragraph N, where the alpha-olefin-derived units are ethylene-derived units, and where the propylene-based elastomer includes less than 8 wt % ethylene-derived units.

Paragraph P: The nonwoven fabrics of Paragraphs N—O, where the melt temperature of the core, as determined by DSC, is at least 5% greater than the melt temperature of the sheath.

Paragraph Q: The nonwoven fabrics of Paragraphs N—P, where the melt temperature of the core, as determined by DSC, that is greater than 125° C. and the flexural modulus of the core, as determined by ASTM D-790, is greater than 1,000 MPa.

Paragraph R: The nonwoven fabrics of Paragraphs N-Q, where the sheath has a melt temperature, as determined by DSC, of from about 85 to about 120° C.

Paragraph S: A process for forming bicomponent polymer fibers, the process comprising extruding first and second polymeric compositions to thereby form a sheath-core structure, where the first polymeric composition forms the sheath and the second polymeric composition forms the core, where the first polymeric composition includes a propylene-based polymer and from about 3 to about 15 wt % alpha-olefin-derived units, has a triad tacticity greater than about 75%, and a heat of fusion less than about 75 J/g.

Paragraph T: The process of Paragraph S, further comprising the step of forming a web of the fibers.

Paragraph U: A process for forming an air-through nonwoven fabric, the process comprising (i) providing bicomponent fiber including a sheath, where the sheath includes a propylene-based elastomer, said propylene-based elastomer including propylene-derived units and from about 3.0 to about 15 wt % alpha-olefin-derived units other than propylene-derived units, based upon the entire weight of the copolymer, said propylene-based elastomer having a triad tacticity of greater than 75%, and a heat of fusion, as determined by DSC, of less than 75 J/g, and a core, where the melt temperature of the core, as determined by DSC, is at least 5% greater than the melt temperature of the sheath; (ii) forming fibers into a web of the fibers; and (iii) exposing the web to air having a temperature from 100 C° to 120 C° to thereby bond the fibers within the web.

Paragraph V: The process of Paragraph U, wherein a pack pressure is less than 600 psi at 0.6 ghm.

In order to demonstrate the practice of the present invention, the following examples have been prepared and tested. The examples should not, however, be viewed as limiting the scope of the invention. The claims will serve to define the invention.

Various modifications and alterations that do not depart from the scope and spirit of this invention will become apparent to those skilled in the art. This invention is not to be duly limited to the illustrative embodiments set forth herein.

What is claimed is:

1. A process for forming bicomponent polymer fibers, the process comprising: extruding a first polymeric composition and a second polymeric composition to thereby form a sheath-core structure, wherein the extruding comprises meltspinning at a meltspinning speed greater than 2800 meters/minute (m/min) and at a throughput of 0.6 ghm is used to form the bicomponent polymer fibers, wherein the first polymeric composition forms the sheath and the second polymeric composition forms the core, where the first polymeric composition is a propylene-based elastomer having 4 wt % to 6 wt % of ethylene-derived units, has a triad tacticity greater than about 75%, has an MFR from 6 to 55 g/10 min-, and a heat of fusion less than about 75 J/g, wherein the sheath consists of the first polymeric composition, and wherein the second polymeric composition has an MFR greater than the first polymeric composition.

2. The process of claim 1, further comprising the step of forming a web of the fibers.

3. A process for forming an air-through nonwoven fabric, the process comprising:
   providing a bicomponent fiber including a sheath and a core, wherein the sheath consists of a propylene-based elastomer having a first polymeric composition, and wherein the core comprises a second polymeric composition, wherein providing the bicomponent fiber comprises extruding by meltspinning at a meltspinning speed greater than 2800 meters/minute (m/min) and at a throughput of 0.6 ghm, the propylene-based elastomer including propylene-derived units and having wt % to 6 wt % of ethylene-derived units, based upon the entire weight of the propylene-based elastomer, the propylene-based elastomer having a triad tacticity of greater than 75%, has an MFR from 6 to 55 g/10 min, and a heat of fusion, as determined by DSC, of less than 75 J/g, and wherein the second polymeric composition has an MFR greater than the first polymeric composition, where the melt temperature of the core, as determined by DSC, is at least 5% greater than the melt temperature of the sheath b. forming fibers into a web of the fibers; and c. exposing the web to air having a temperature from 100° C. to 120° C. to thereby bond the fibers within the web.

4. The process of claim 3, wherein a pack pressure less than 600 psi at 0.6 ghm is used to form the fibers.

5. The process of claim 3, wherein the melt temperature of the core, as determined by DSC, that is greater than 125° C. and the flexural modulus of the core, as determined by ASTM D-790, is greater than 1,000 MPa.

6. The process of claim 3, wherein the melt temperature of the core is at least 20% greater than the melt temperature of the sheath.

7. The process of claim 3, wherein the melt temperature of the core is at least 15° C. greater than the melt temperature of the sheath.

8. The process of claim 3, wherein the melt temperature of the core is at least 30° C. greater than the melt temperature of the sheath.

9. The process of claim 3, wherein the flexural modulus of the core is at least 1,000 MPa greater than the flexural modulus of the sheath.

10. The process of claim 3, wherein the flexural modulus of the core is at least 1,300 MPa greater than the flexural modulus of the sheath.

11. The process of claim 3, wherein the sheath has a flexural modulus, according to ASTM D-790, of from about 100 to about 1,000 MPa.

12. The process of claim 3, wherein the sheath has a melt temperature, as determined by DSC, of from about 85 to about 120° C.

13. The process of claim 3, wherein the sheath includes a first propylene-based elastomer and a second propylene-based elastomer, where the first propylene-based elastomer has an MFR, according to ASTM D-1238, 2.16 kg weight @230° C., of from about 6 to about 55 g/10 min, and where the second propylene-based elastomer has an MFR, according to ASTM D-1238, 2.16 kg weight @ 230° C., of from about 6 to about 80 g/10 mm.

14. The process of claim 1, wherein a melt temperature of the propylene-based elastomer, as determined by DSC, is from 95 to 110° C.

15. The process of claim 3, wherein a melt temperature of the propylene-based elastomer, as determined by DSC, is from 95 to 110° C.

* * * * *